Patented Aug. 4, 1925.

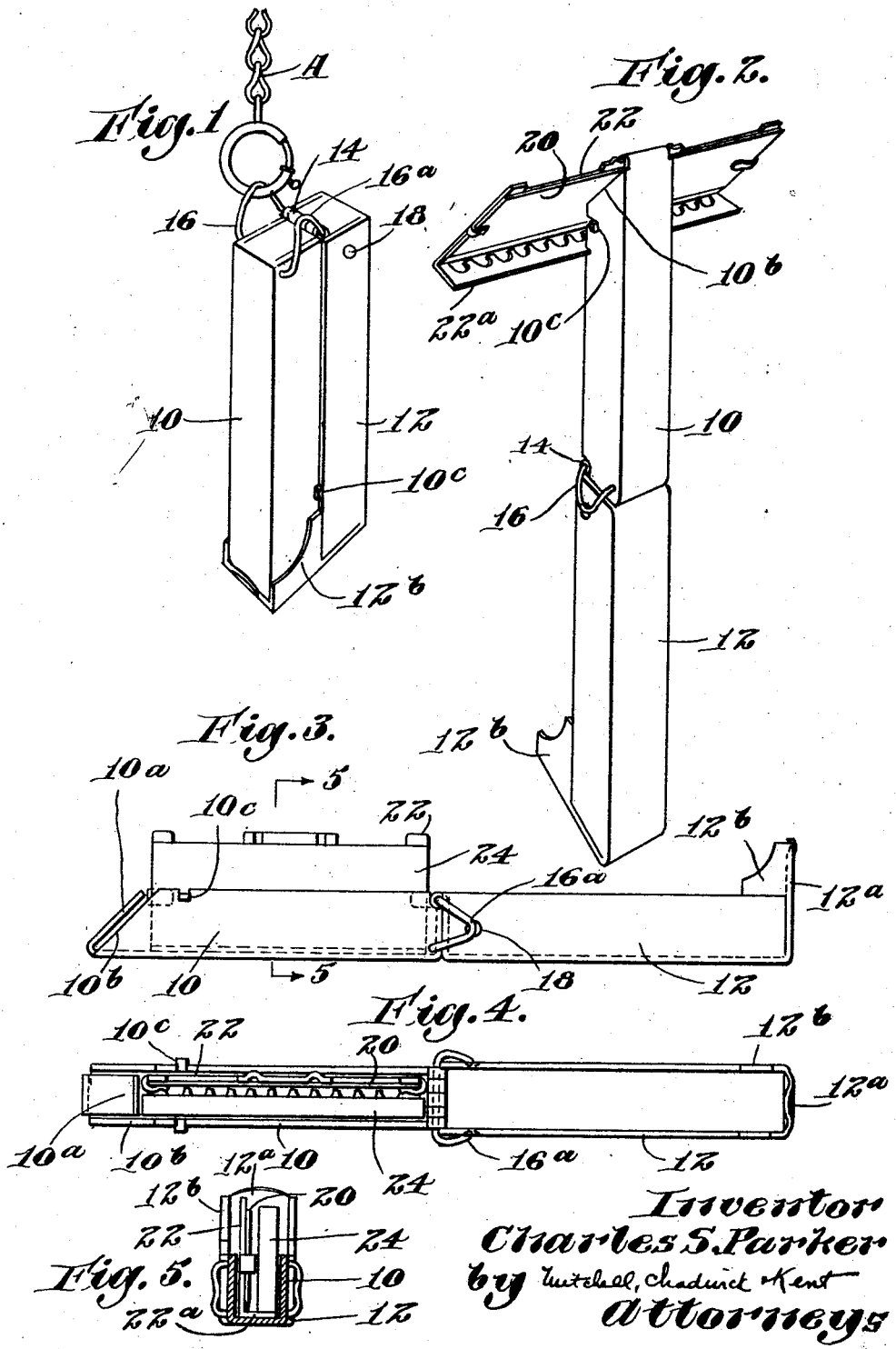

1,548,164

UNITED STATES PATENT OFFICE.

CHARLES S. PARKER, OF BOSTON, MASSACHUSETTS.

HANDLE FOR SAFETY RAZORS AND THE LIKE.

Application filed January 30, 1924. Serial No. 689,535.

*To all whom it may concern:*

Be it known that I, CHARLES S. PARKER, a citizen of the United States, residing at Boston, in the county of Suffolk and State of Massachusetts, have invented certain new and useful Improvements in Handles for Safety Razors and the like, of which the following is a specification.

This invention relates to improvements in handles for safety razors and the like. It is particularly directed to improving the compactness of safety razors and their containers, so that the handle is adapted to hold the blade and guard plate, both when the razor is in use, and when it is not in use, serving in the latter case as a compact container so small as to take little space in one's waistcoat pocket, or in a pocketbook. The compactness is obtained without reduction of the razor blade size to an undesirable degree; and at the same time the invention provides a handle affording secure control of the razor while shaving.

It is therefore among the objects of the present invention to provide a handle-container adapted to hold a blade of normal size and rigidity and at the same time to offer sufficient gripping surface for the hand to firmly grasp and manipulate the razor. Another object is to provide for the packaging within the hollow of the handle this normal size blade, its guard plate and spare blades.

These objects are attained by providing a casing, having two longitudinal members preferably in the nature of metallic oblong shells whose longitudinal edges can be placed together with the hollow of one opening into the hollow of the other, thus jointly making a sizable space wherein the blades, plate, etc. may be stored. These shells may also be placed and held end to end, to form a handle of approximately double the length of this container. One end of one shell has suitable means for gripping the blade and guard plate, while the remainder of that shell plus all of the other shell affords ample handle gripping surface for the user. The shell may be stamped from sheet metal, and may be hinged together so as to swing from side by side parallelism into end to end alignment, according as the shells are to serve as a container or as a handle for the thing contained.

It is intended that the patent shall cover, by suitable expression in the appended claims whatever features of patentable novelty exist in the invention disclosed.

In the accompanying drawing:

Figure 1 is a perspective, showing the shells or members closed together and constituting a container;

Figure 2 is another perspective, showing the device open, serving as a handle for a razor blade and guard plate;

Figure 3 is a side elevation of the device opened;

Figure 4 is a plan, looking into the hollow of the open shells; and

Figure 5 is an elevation, in section, on line 5—5 of Figure 3.

Referring to the drawings, the handle-container comprises two oblong open-topped shells or hollow members 10 and 12 capable of being combined together sidewise to make a container and endwise to make a tool. They are of substantially the same length and depth, but with one slightly wider than the other so that when placed in parallelism, with their longitudinal edges together to constitute a container as in Figure 1, the wider shell will fit over the narrower shell with adjacent edges slightly overlapping. As illustrated in the embodiment of the invention shown, these members are of sheet metal cut and folded to the desired oblong shapes, each having two ends, three closed sides, and one open side, herein for convenience called its "top"; and they have a hinged connection 14 at their ends, so that they can swing into parallelism, with their tops together, for forming a closed container as in Figure 1; or into alignment, end to end, as in Figure 2, to form a handle twice as long as in either shell alone. In the construction chosen for illustration, the same wire 16 which serves as the pivot of the hinge 14 also constitutes a locking means for holding the shells in alignment when they have been so swung about the hinge. This pivot wire is prolonged out from each end of the hinge, and at each such prolongation is bent so as to extend further in the general direction of the length of the shells 10 and 12, and then to return to one of the other of these members, thus making a loop. Its ends are fastened on such shell, preferably the narrower one 10, at the same end where the hinge is but at the edge thereof opposite to that which has the hinge. At its peak 16ª each loop is slightly bent toward the other so that as the shells are swung into alignment, the broader shell will be forced between the loops, slightly springing them apart until, as the adjacent ends of the shells come together, with the shells themselves in alignment, the bent loop-peaks spring into shallow depressions 18 in the surface of the broader shell and thereby hold the two shells in this position of alignment.

The other end of the narrower shell, that is the end remote from the hinge, is provided with means for fastening the blade 20, guard plate 22, and handle together. The particular means illustrated are adapted to engage a plate and blade of the type shown in my United States Patent 1,460,139, granted to me on June 26, 1923. In this adaptation of the invention, the blade engaging end of the shell is made with a sort of re-entrant tongue 10$^a$ which is bent obliquely back over the end and toward the body of the handle, and in conjunction with the similarly oblique terminal edges 10$^b$ of the side walls of the shell constitutes a clamp within which the blade and plate are pressed together. The guard flange 22$^a$ of the guard plate, at and extending away from the cutting edge, engages the side walls of the shell to further support and steady the blade.

The end wall 12$^a$ of the remote end of the other handle member is also in the form of a spring tongue, being extended above the level of its top so as to overlie and cover the end of the other shell member when the two are folded with their tops together. This tongue is slightly turned inward at its extremity to cause it to ride up on the bent-back tongue 10$^a$ of the clamp member, as they close, and then to spring down over the remote edge or root thereof, with latch effect, to hold the members together. Short side walls or ears 12$^b$ on the larger tongue 12$^a$, parallel with the side walls of the shell, overlie and close the space left at the end of the other member 10 by the cutting of its side walls on a bevel at 10$^b$ and the bending back of its blade clamping tongue 10$^a$.

After shaving, the blade and plate are slipped into the hollow of the narrower shell member 10, together with a stock of spare blades 24, as seen in Figures 3, 4 and 5, and then the other shell member 12 is to be swung out of the grip of the loop lock 16, and closed over the blades and plate, until the bend on the end of its tongue 12$^a$ springs into locking position. To prevent the narrow shell from swinging too far within the other, short lugs 10$^c$ at the contacting edges of the narrow shell are turned outward so as to engage the corresponding edges of the broader member and thus limit the degree of swing between them. The whole may then be hung on the end of a watch chain A, or carried in a purse or pocket without inconvenience, because when the blade and plates are thus stored within the hollows of the folded shells, the space occupied by all is remarkably small. Yet with the handle unfolded or extended, it affords as great a hand grip surface as is found in the normal sized safety razor, and is quite enough to enable the razor to be manipulated with ease; while the metallic channel cross-section of the shells, and their firm end to end plane bearing, give ample stiffness and strength.

I claim:

1. A container adapted to serve as a detachable handle for the thing contained, comprising a pair of shells arranged to be secured together side by side to form the container and to be secured together end to end to form the handle; one of said shells having means for rigidly engaging the thing contained as a handle therefor.

2. A container adapted to serve as a detachable handle for the thing contained, comprising a casing divided medially longitudinally into parts which are hinged together so that they may be swung together side by side to form the container and may be swung together end to end to form the handle; means on one of said parts for clamping the thing contained as a handle therefor; and means on one of said parts for clamping the other of said parts when swung together end to end, thereby to lock the said parts together.

3. A container adapted to serve as a detachable handle for the thing contained, comprising a casing having a pair of long metallic shells each with an open side, adapted to be placed in parallelism with the edges of their longitudinal openings to form the container, and to be placed in alignment with firm end bearing of one against an end of the other, to form a handle; there being means on one of said shells for clamping the thing contained, and other means for clamping the other shell when said shells are in alignment, thereby to form a stiff handle for the thing clamped.

4. A combined container and operating handle for a safety razor or the like comprising a pair of open-topped long shells, arranged to be secured together with their tops together, to form a closed container, and to be secured stiffly together end to end to form the handle; one of said shells being adapted at its end to clamp the razor blade.

5. A combined container and operating handle for a safety razor or the like comprising a pair of bent sheet metal open-topped shells, hinged so as to close their tops together, thus making a container, and to open them into alignment thus making a handle; the end wall of one being adapted to engage the razor when open, and the end wall of the other being adapted to spring over and cover said razor engaging wall when closed.

6. A container adapted to serve as a handle for the thing contained, comprising a two-part casing; a hinge joining said parts and adapted to permit them to unite laterally to make a container, and to unite in alignment with each other endwise to form a handle; the pivot wire of said hinge being prolonged and bent into spring loops on one part for laterally-clamping the other part.

Signed at Boston, Massachusetts, this twenty-eighth day of January, 1924.

CHARLES S. PARKER.